United States Patent Office 3,773,802
Patented Nov. 20, 1973

3,773,802
N-ARYLSULFONYL-N'-2-TETRAHYDRO-DICYCLOPENTADIENYLUREAS
Albrecht Zschocke, Bad Durkheim, Horst Kummer, Ludwigshafen, Eike Mayrhofer, Offstein, Josef Kimmig, Hamburg, and Hans Kiefer, Wachenheim, Germany, assignors to Badische Anilin- & Soda-Fabrik Aktiengesellschaft, Ludwigshafen (Rhine), Germany
No Drawing. Filed Aug. 28, 1970, Ser. No. 68,054
Claims priority, application Germany, Sept. 5, 1969,
P 19 45 007.8
Int. Cl. C07c 127/12
U.S. Cl. 260—397.7            6 Claims

ABSTRACT OF THE DISCLOSURE

N-arylsulfonyl - N' - 2 - tetrahydrodicyclopentadienylureas and antidiabetic preparations containing them, and a method for their manufacture.

---

The present invention relates to new and valuable N-arylsulfonyl-N'-2-tetrahydrodicyclopentadienylureas and to antidiabetic preparations containing them, and to the production of the same.

It is known that arylsulfonylurea derivatives have the property of lowering the level of blood sugar and are therefore suitable as antidiabetic substances for peroral administration. N-(4-aminobenzenesulfonyl)-N'-n-butylurea and N-(4-methylbenzenesulfonyl)-N'-n-butylurea have achieved great importance because of their property of lowering the level of blood sugar and their compatibility in diabetes therapy.

We have now found that arylsulfonylureas having the general formula:

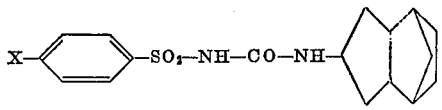

where X denotes a methyl, acetyl, methylmercapto or amino group or a chlorine atom, are distinguished by a marked lowering of the blood sugar level which is superior to that of N-(4-methylbenzenesulfonyl)-N'-n-butylurea (tolbutamide).

The effect of the compounds according to this invention in lowering the level of blood sugar is surprising because N - (4 - methylbenzenesulfonyl)-N'-1-tetrahydrodicyclopentadienylurea which is only a position isomer and has a melting point of 169°C. exhibits practically no action.

The active substances may be prepared (a) by reaction of arylsulfonyl derivatives having the formula:

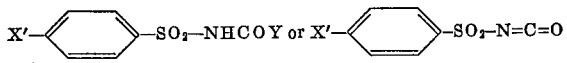

with tetrahydrodicyclopentadienyl-2-amine or by reaction of tetrahydrodicyclopentadienyl derivatives having the formula:

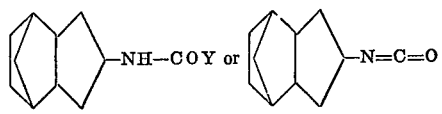

with an arylsulfonylamine having the formula:

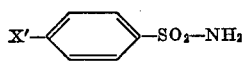

(b) by oxidation of arylsulfonylthioureas having the formula:

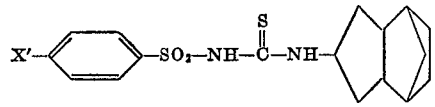

(c) by alkaline hydrolysis of an arylsulfonylguanidine having the formula:

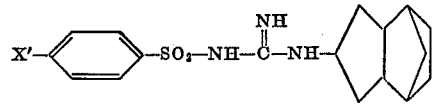

(d) by acid treatment of an arylsulfonylisourea derivative having the formula:

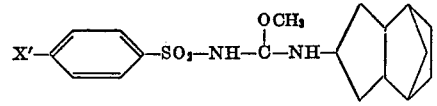

where X' denotes a methyl, acetyl or methylmercapto group or a chlorine atom, a nitro group or an acylamino group and Y denotes a hydroxyl, alkoxy, amino, alkylamino, arylamino or arylsulfonylamino group or a chlorine atom, with the proviso that, in the case of a nitro or acylamino group, these are converted after the reaction into the free amino groups. The acyl groups are to be derived from all acid radicals normally used for the protection of amino groups from undesired reaction. These include for example the formyl, acetyl, propionyl and benzoyl groups.

The starting material for the production of p-aminobenzenesulfonylureas may be for example an acylated p-aminobenzenesulfonyl isocyanate which is reacted with tetrahydrodicyclopentadienyl-2-amine and then the protective acyl group is removed again by hydrolysis.

Tetrahydrodicyclopentadienyl-2-amine may be prepared by reaction of 1 mole of dihydrodicyclopentadiene with 5 to 10 moles of hydrocyanic acid in the presence of 2 to 5 moles of 88 to 96% sulfuric acid and at least 1 mole of water, followed by hydrolysis of the isomeric formamides formed, and by separation by distillation of the mixture of the two positional isomeric tetrahydrodicyclopentadienyl-1- and -2-amines.

The following data illustrate the production of the new arylsulfonylureas. The parts mentioned are parts by weight.

EXAMPLE

N-(4-methylbenzenesulfonyl)-N'-2-tetrahydrodicyclopentadienylurea 151 parts of tetrahydrodicyclopentadienyl-2-amine is dissolved in 300 parts of dry benzene and while stirring at room temperature 197 parts of 4-methylbenzenesulfonyl isocyanate is added thereto in portions. The reaction mixture is stirred for another two hours, allowed to stand for twelve hours and the deposited crystals are suction filtered. The product is recrystallized twice from toluene. 270 parts of N-(4-methylbenzenesulfonyl)-N'-2-tetrahydrodicyclopentadienylurea is obtained having a melting point of 172° to 174° C. (yield: 78% of the theory).

The chlorine derivative is prepared in the same way from 4-chlorobenzenesulfonyl isocyanate and tetrahydrodicyclopentadienyl-2-amine. Its melting point is 160° to 162° C.

To test the effect in lowering blood sugar level, the sulfonylureas are introduced as a carboxymethyl cellulose suspension by means of a probang into the empty stomachs of female Wistar rats of normal metabolism and weighing 130 to 150 g. Blood is removed by the orbital method immediately before the oral dose and two hours after the same. The glucose content is determined by the enzymatic method (Color test for blood sugar, C. F. Boehringer GmbH, Mannheim). In the following table the fall in blood sugar is given as a percentage of the original value; the fall obtained under the same experimental conditions with tolbutamide and the isomeric N-(4 - methylbenzenesulfonyl)-N'-tetrahydrodicyclopentadienylurea is also given for comparison.

Tolbutamide in the table is not effective under the given conditions (minimum effective dose: 25 mg./kg.).

In the table the following abbreviations are used:

No=number of animals
Dose=oral dose in mg./kg.
OV=original value
Percent fall=percentage fall after two hours.

We claim:
1. An arylsulfonylurea having the formula:

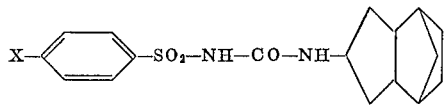

where X denotes a methyl group, acetyl group, methylmercapto group, amino group or a chlorine atom.
2. The compound of claim 1 wherein X is methyl.
3. The compound of claim 1 wherein X is chlorine.
4. The compound of claim 1 wherein X is $NH_2$.
5. The compound of claim 1 wherein X is acetyl.
6. The compound of claim 1 wherein X is methylmercapto.

TABLE.—THE EFFECT OF SULFONYLUREAS ON THE BLOOD SUGAR LEVEL OF WISTER RATS (Color test for blood sugar, C. F. Boehringer G.m.b.H., Mannheim)

| No. | Preparation administered | Dose | OV | Percent fall |
|---|---|---|---|---|
| 6 | $H_3C$—⟨ ⟩—$SO_2$—NH—CO—NH— (tetrahydrodicyclopentadienyl) | 5 / 1.5 | 62 / 61 | 38 / 20 |
| 6 | $H_3C$—⟨ ⟩—$SO_2$—NH—CO—NH—n-$C_4H_9$ | 5 / 1.5 | 52 / 61 | 0 / 0 |
| 6 | $H_3C$—⟨ ⟩—$SO_2$—NH—CO—NH— (isomeric tetrahydrodicyclopentadienyl) | 5 / 1.5 | 62 / 54 | 3 / 0 |

References Cited

UNITED STATES PATENTS

| | | | |
|---|---|---|---|
| 2,969,391 | 1/1961 | Aeschlimann et al. | 260—553 D |
| 3,096,372 | 7/1963 | Gerzon | 260—553 D |
| 3,072,720 | 1/1963 | Wright | 260—553 D |

OTHER REFERENCES

C. A. 64: 13272f (1966) Muntoni.
C. A. 61: 2376e (1964) Danowski et al.

HENRY R. JILES, Primary Examiner

S. D. WINTERS, Assistant Examiner

U.S. Cl. X.R.

260—553 D, 563 R, 471 C, 518 R, 518 A, 453 AP, 468 B, 514 B, 553 R, 552 R, 556 C, 556 AR, 556 B; 424—321

UNITED STATES PATENT OFFICE
CERTIFICATE OF CORRECTION

Patent No. 3,773,802　　　　　Dated November 20, 1973

Inventor(s) Albrecht Zschocke et al

It is certified that error appears in the above-identified patent and that said Letters Patent are hereby corrected as shown below:

Column 2, lines 16-20, should read

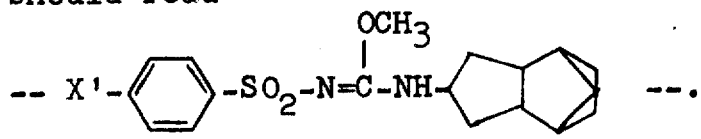

Column 2, line 70, "probang" should read -- probe --.

Column 3, line 9, "(4 - methylbenzenesulfonyl)-N'-tetrahydrodicyclopenta-" should read -- (4 - methylbenzenesulfonyl)-N'-1-tetrahydrodicyclopenta- --.

Column 3, table, column "No.", each example "6" should read
-- 6 --.
　　6

Column 3, table, second formula,

" 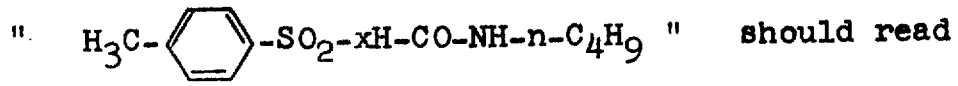 "　　should read

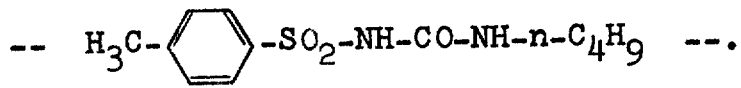 --.

Signed and sealed this 29th day of October 1974.

(SEAL)
Attest:

McCOY M. GIBSON JR.　　　　　　　　C. MARSHALL DANN
Attesting Officer　　　　　　　　　Commissioner of Patents